June 16, 1931. E. D. BENDER 1,810,236
FLOWERPOT
Filed Aug. 18, 1930
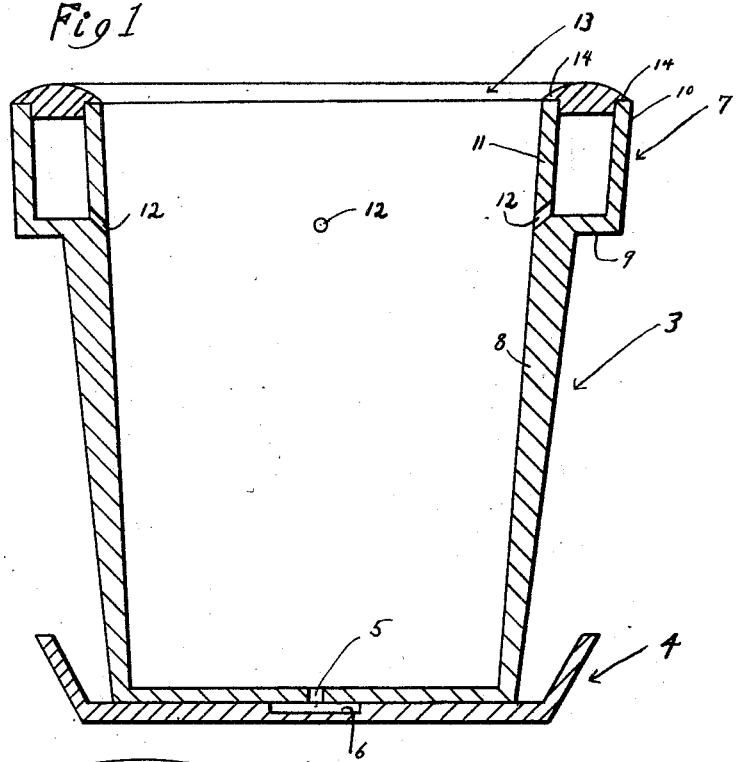
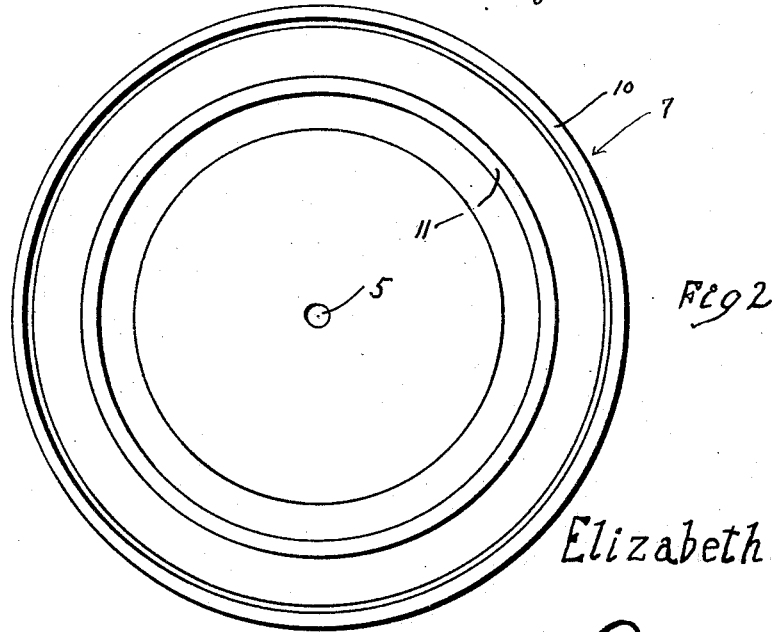
Inventor
Elizabeth D. Bender Patented June 16, 1931

1,810,236

UNITED STATES PATENT OFFICE

ELIZABETH D. BENDER, OF CLEARFIELD, IOWA, ASSIGNOR OF ONE-HALF TO BEATRICE MARIE BENDER, OF CLEARFIELD, IOWA

FLOWERPOT

Application filed August 18, 1930. Serial No. 476,210.

This invention relates to an improved flower pot, the primary feature of which is a novel watering device.

In carrying the inventive conception into actual practice, I have evolved and produced a simple and economical pot construction which is characterized by a feasible type of watering trough at the upper portion thereof for permitting proper seepage of water from the trough into the soil of the pot.

The exact details which serve to characterize this invention will become more readily apparent from the following description and drawings. In the drawings:

Figure 1 is a central vertical sectional view through a pot constructed in accordance with the present invention.

Figure 2 is a top plan view thereof with the removable angular lid and its connection.

In the drawings, in Figure 1, the pot is generally represented by the numeral 3 and the receiving plate or tray by the numeral 4. The pot is formed at its bottom with a water discharge port 5 emptying into a shallow recess 6 at the center of the plate 4. These features are of no particular consequence so far as the predominating novelty of the invention is concerned in comparison with prior art devices.

The principal feature of the invention is the watering trough 7 around the upper mouth portion of the body of the pot. In producing this feature, the wall of the pot may be gradually thickened to a predetermined point near the top and then fashioned to provide an outstanding peripheral ledge 8 and an upstanding marginal rim 10. The corresponding portion of the wall 8 thin as at 11 and formed with downwardly discharging orifices or water discharge ports 12.

The rim 10 and the wall 11 form a receptacle which is generally defined as the water receiving and dispensing trough. The numeral 13 represents an annular removable lid which has its marginal portions reduced as at 14 to rest nicely on the upper edges of the walls 10 and 11 and has its central portion thickened to depend slightly into the water space.

Incidently this lid may be composed of sections to facilitate application and removal as well as supplying water to the trough.

The pot as a whole, including the watering trough is a distinguishable contribution to the art. This feeds and distributes the water slowly and correctly through the upper port 12. This gravitates downwardly and permeates the upper and lower subsoil such as is so essential to exacting requirements for growth of plants. The arrangement keeps the roots toward the bottom of the pot and confined in the dirt for vigorous growth and leaves around one-fourth of an inch of dry or porous mulch on top of the dirt of the pot to allow the air to penetrate the soil and the moisture to come up from the subsoil to benefit the upper plant growth, and this being especially advantageous in a dry hot room.

In this arrangement, a small amount of water will settle in the bottom of the trough and the trough can be left uncovered if desired to benefit the plant and to afford a noticeable supply of air.

Below, I will list numerically the advantages and features which characterize this invention by way of contrast with prior patented and marketed watering-pots with which I am at present familiar.

1. The simple construction would make it a greater commercial success and the easiness of potting or repotting plants in or from it and the efficiency of the watering method I can recommend after two years experimenting with the same.

2. My water container answers three purposes, to water the plant or moisten the dirt precisely, to enable owner to carry pot around easily and put a finish to the upper portion of the pot.

3. The size and certain number of holes in this water container is placed where water will reach center of dirt between two opposite sides of pot, where roots of plant should begin, and go slowly down toward the bottom of the pot.

4. Holes are up high enough in pot to eliminate danger of plant roots growing through them into water receptacle, as roots certainly would in the pots where holes for watering are lower down.

5. This height of holes from bottom eliminates dirt from water container almost completely, but if any should accrue in same, the shallow depth of my water container allows easy removal, free from roots and no danger of restricting the watering process.

6. Water will gravitate so much faster than it will elevate that holes located at top of pot where I have them will moisten dirt in pot more evenly and leave the one-fourth inch dry or porous mulch on top of dirt, so essential to good growth of plant. Therefore, in my slow watering system not much water, (if any) is drained from dirt, nor is the bottom too wet.

7. My water space will hold the right amount of water to moisten dirt correctly, the size of receptacle in accord with size of pot. This eliminates the possibility of getting dirt too wet for good growth of plant.

8. My flower holder or pot of single construction has the advantage of double pots in bulk, expense to the producer and purchaser, trouble and weight in handling. Mine has nothing to get out of place but lid and a more all-round efficiency for the plant's best growth.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. As a new product of manufacture, a watering flower pot comprising a pot proper having an upwardly thickened wall formed adjacent its top with an outstanding marginal ledge and an upstanding marginal rim integrally joining said ledge, the upper portion of said wall above said ledge being relatively thin and said rim and thin wall being spaced apart to form an intervening space constituting a water receiving trough, said thin wall being formed with circumferentially spaced diagonal water discharge ports, and a removable lid for said trough having thin marginal edge portions resting on the upper edges of the trough walls and a relatively thick central portion depending into the water space.

2. A flower pot having a trough surrounding the upper end thereof, the inner wall of the trough having ports therein sloping downwardly and inwardly from the bottom of the trough whereby water placed in the trough will pass through said ports into the pot, the inner wall of the trough above the perforations being imperforate and an annular cover for the trough having portions at its edges engaging the inner and outer walls of the trough.

In testimony whereof I affix my signature.

Mrs. ELIZABETH D. BENDER.